US008832799B2

(12) United States Patent
Matsimanis et al.

(10) Patent No.: US 8,832,799 B2
(45) Date of Patent: Sep. 9, 2014

(54) METHODS AND APPARATUSES FOR HYBRID DESKTOP ENVIRONMENT DATA USAGE AUTHENTICATION

(75) Inventors: Peter A. Matsimanis, Schaumburg, IL (US); Michael A. Root, Waukegan, IL (US); Ansuman Tapan Satpathy, Sunnyvale, CA (US); Vishal Sood, Santa Clara, CA (US)

(73) Assignee: Motorola Mobility LLC, Mountain View, CA (US)

( * ) Notice: Subject to any disclaimer, the term of this patent is extended or adjusted under 35 U.S.C. 154(b) by 93 days.

(21) Appl. No.: 13/285,507

(22) Filed: Oct. 31, 2011

(65) Prior Publication Data
US 2013/0111556 A1 May 2, 2013

(51) Int. Cl.
H04L 29/06 (2006.01)
H04L 12/64 (2006.01)

(52) U.S. Cl.
CPC ............ *H04L 12/64* (2013.01); *H04L 12/6418* (2013.01)
USPC ................................ 726/4; 709/217; 709/231

(58) Field of Classification Search
CPC ............................ H04L 12/64; H04L 12/6418
USPC ........................................ 726/4; 709/217, 231
See application file for complete search history.

(56) References Cited

U.S. PATENT DOCUMENTS

| | | | | |
|---|---|---|---|---|
| 6,754,488 | B1 * | 6/2004 | Won et al. ...................... | 455/424 |
| 7,058,709 | B2 * | 6/2006 | Lamberton et al. ............ | 709/224 |
| 7,069,330 | B1 * | 6/2006 | McArdle et al. ............... | 709/229 |
| 7,149,524 | B2 | 12/2006 | Reynolds | |
| 7,852,758 | B2 * | 12/2010 | Kataoka et al. ................ | 370/230 |
| 8,024,808 | B1 * | 9/2011 | Gleichauf ........................ | 726/26 |
| 8,156,263 | B2 | 4/2012 | Uehara | |
| 2003/0043057 | A1 * | 3/2003 | DiDomenico et al. ......... | 340/933 |
| 2007/0143222 | A1 * | 6/2007 | Chicks et al. .................... | 705/59 |
| 2008/0212651 | A1 | 9/2008 | Santhoff et al. | |
| 2008/0310378 | A1 * | 12/2008 | Kitazoe et al. ................ | 370/338 |
| 2010/0082489 | A1 | 4/2010 | Lin et al. | |
| 2010/0107231 | A1 * | 4/2010 | Kavanagh et al. ................ | 726/7 |
| 2010/0110890 | A1 | 5/2010 | Rainer et al. | |

(Continued)

OTHER PUBLICATIONS

Madan, "Securely Adopting Mobile Technology Innovations for your Enterprise using IBM Security Solutions", Jul. 1, 2013, IBM, p. 1-42.*

(Continued)

*Primary Examiner* — Taghi Arani
*Assistant Examiner* — Gregory Lane
(74) *Attorney, Agent, or Firm* — McDermott Will & Emery LLP

(57) ABSTRACT

A method in a portable electronic device (100) of authenticating enhanced wide area network data usage capabilities is provided. Data communication between the portable electronic device and a wide area network (104) is detected, along with commencement a dual-operating system hybrid environment (111). The dual-operating system hybrid environment can include a first operating system environment (114) operable to communicate with the wide area network at a restricted data rate and a second operating system environment (116) operable to communicate with the wide area network at either the restricted data rate or an enhanced data rate. A verification whether the portable electronic device is authorized to communicate with the wide area network at the enhanced data rate is then performed. Where true, the second operating system environment can be configured to communicate with the wide area network at the enhanced data rate.

20 Claims, 10 Drawing Sheets

(56) References Cited

U.S. PATENT DOCUMENTS

2010/0121975 A1* 5/2010 Sinha et al. ............... 709/231
2010/0161975 A1* 6/2010 Ducharme et al. ........ 713/164
2010/0211698 A1 8/2010 Krishnaswamy
2011/0314522 A1* 12/2011 Palanigounder et al. .... 726/4
2013/0042295 A1* 2/2013 Kelly et al. ................. 726/1
2013/0086202 A1* 4/2013 Connelly et al. .......... 709/217

OTHER PUBLICATIONS

Patent Cooperation Treaty, International Search Report and Written Opinion of the International Searching Authority for International Application No. PCT/US2012/061254, Feb. 12, 2013, 13 pages.

* cited by examiner

METHODS AND APPARATUSES FOR HYBRID DESKTOP ENVIRONMENT DATA USAGE AUTHENTICATION

BACKGROUND

1. Technical Field

This invention relates generally to portable electronic devices, and more particularly to network authentication for portable electronic devices.

2. Background Art

Communication technology is constantly evolving. For instance, there was a time where the only way to make a telephone call was across a copper wire with the assistance of a human operator. Today, by contrast, people are able to call others around the world with a variety of communication devices, including cellular telephones, satellite telephones, and network-based communication systems such as voice over Internet protocol phone devices that function with the assistance of a computer or other specialized hardware. In addition to these voice-based channels, people may communicate via electronic mail, text messaging, videoconferences, and multimedia messaging as well.

With the advent of new communication protocols and technologies, device manufacturers are continually designing more features into their handsets. Similarly, service providers are continually upgrading their networks to accommodate these new features. By way of example, most mobile telephones offered by service providers today include both text and multimedia messaging in addition to voice capabilities.

Service providers of communication networks realize, however, that different users prefer to use a particular device in different ways. For instance, one user may use a fully equipped smart phone for only text communication and voice communication. Another user may use the same smart phone for multimedia communication, web browsing, and voice communication. To accommodate these different uses, the service provider may provide different service subscription plans for use with a particular device. It would be advantageous to have a method and system for ensuring that users use their devices in accordance with their particular subscription plan.

Figure 1:
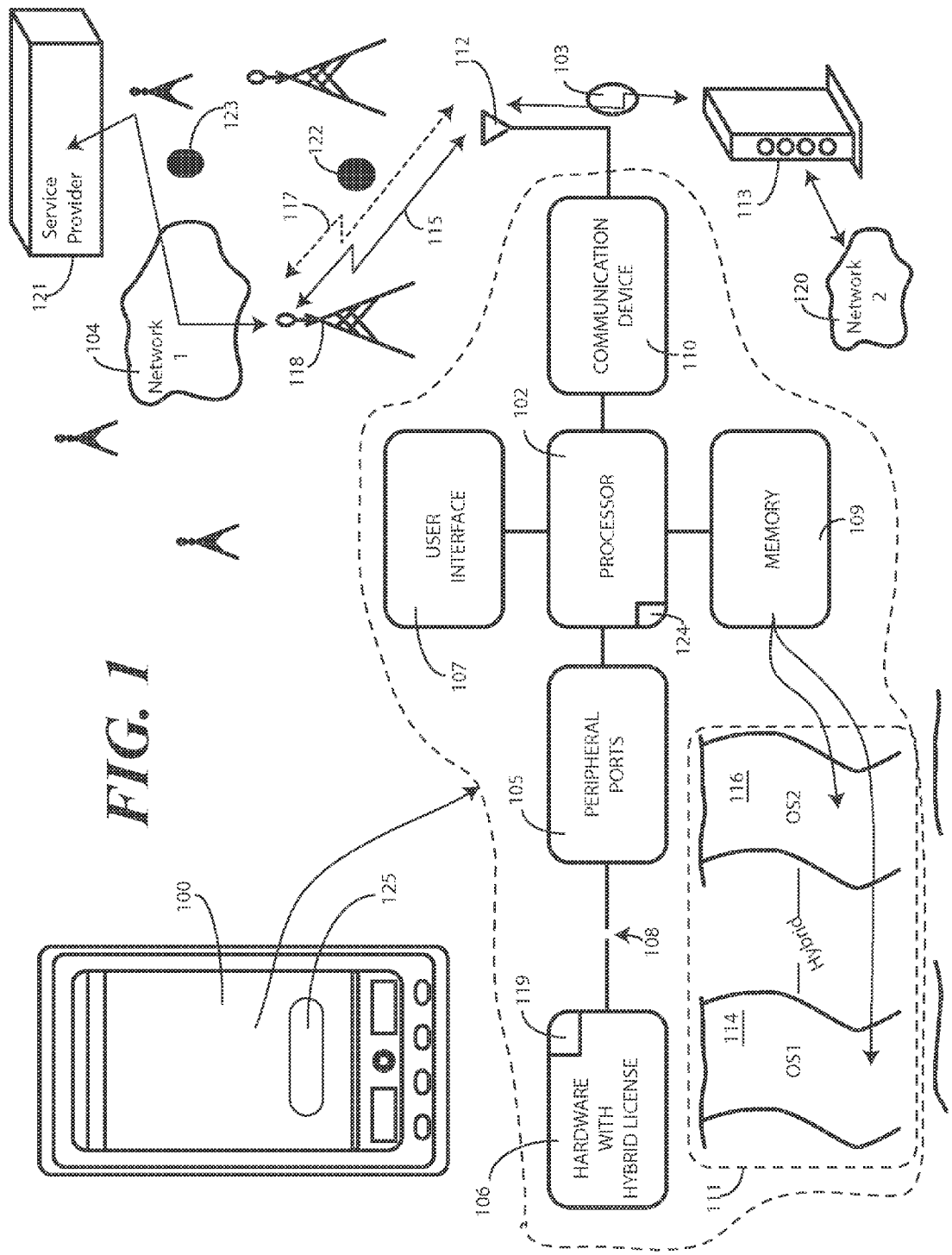
FIG. 1 illustrates one explanatory portable electronic device, along with a schematic block diagram and a network schematic, configured in accordance with one or more embodiments of the invention.
Figure 2:
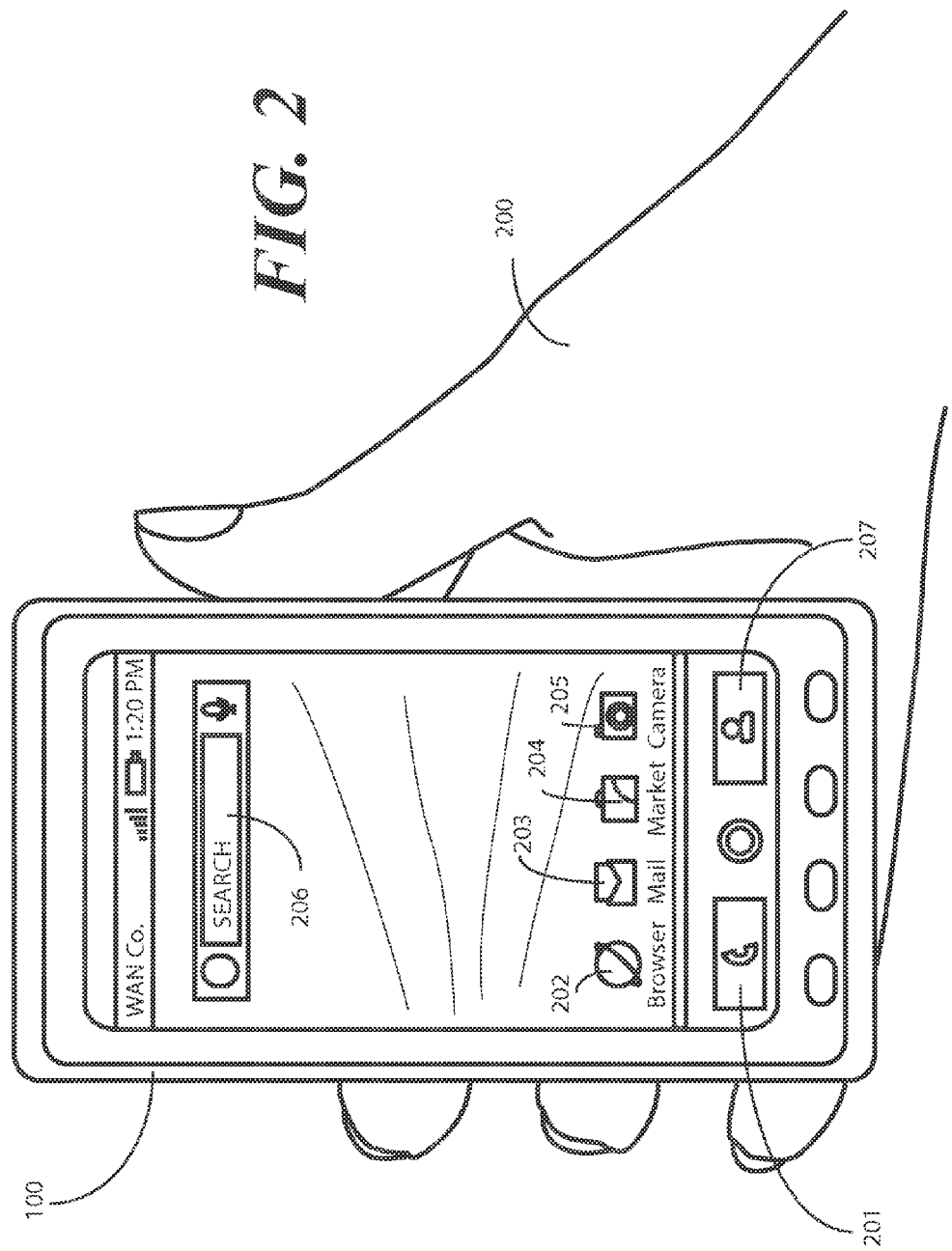
FIG. 2 illustrates one explanatory portable electronic device operating in a first operating system environment of a dual-operating system hybrid environment in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to authenticating enhanced wide area network data usage capabilities in a dual-operating system environment on a portable electronic device. Any process descriptions or blocks in flow charts should be understood as representing modules, segments, or portions of code, which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of authenticating or denying enhanced wide area network data usage capabilities in a portable electronic device as described herein. The non-processor circuits may include, but are not limited to, a radio receiver, a radio transmitter, signal drivers, clock circuits, power source circuits, and user input devices. As such, these functions may be interpreted as steps of a method to perform data usage authentication, operation in enhanced data usage modes, and/or operation in restricted usage modes. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

In one explanatory portable electronic device configured in accordance with one or more embodiments of the invention, one or more processors disposed within the device are configured for operation in a dual-operating system hybrid environment. A first operating system environment is active during normal operation. However, in certain use cases, such as when the device is coupled to a peripheral hardware component having a dual-operating system hybrid environment license, the device can enter a second operating system environment having enhanced data usage capabilities.

In one embodiment, the dual-operating system hybrid environment is referred to as a "WebTop" environment, in that the device has access to two simultaneous operating system environments. The first operating system environment is a standard mobile operating environment, where the device is configured to interact with a wide area network using standard wide area network data rates and usage modes. The second operating system environment gives rise to an enhanced data usage rate, in that the second operating system environment includes an enhanced, full, multi-window desktop environment where the device can access a desktop class web browser and web applications, which are similar to those normally found only on a personal computer. In this second mode of operation, the device also runs the first operating system environment, and accordingly presents one or more dedicated windows that display the content and results of operational steps in the first environment. These windows can be referred to as the "Mobile View" of the WebTop. A user can start, stop, or interact with the first environment applications inside a Mobile View window. The dual-operating system hybrid environment enables the user to access a full desktop computer web browsing experience with a mobile device, e.g., viewing the full desktop versions of Internet websites that include Adobe Flash 10™ based websites through the portable electronic device's built-in web browser and web application framework.

By nature of their design, WebTop applications operating in the second operating system environment download orders of magnitude more data than do the mobile applications operating in the first operating system environment. Accordingly, such WebTop applications require an enhanced data usage rate. Embodiments of the methods described below anticipate that not every user having a WebTop capable portable electronic device will have subscriptions allowing the enhanced data usage rate from a wide area network such as a cellular or mobile communication network. Accordingly, embodiments of the invention described below provide methods and systems for enabling WebTop data usage rates and/or restricting wide area network data access for only those users who are authorized for a particular feature included on their wide area network or cellular account. For example, enhanced data rate usage may be allowed only when the user tries to access the wide area data network using the second operating system environment and is authorized in accordance with authorization method steps. Where not authorized, the user can still be allowed to access conventional wide area network data usage rates within the Mobile View without interruption.

In one embodiment, a method in a portable electronic device of authenticating enhanced wide area network data usage capabilities includes establishing data communication between a communication device operable in the portable electronic device and a wide area network, such as a cellular network. When a certain condition is met, such a peripheral hardware device having a WebTop license key being coupled to the portable electronic device, the device can commence the dual-operating system hybrid environment by launching a second operating system environment in addition to the first operating system environment that is already in operation. As an illustration, the first operating system environment can be operable to communicate with the wide area network at a restricted data rate, while the second operating system environment operable can be configured to communicate with the wide area network at either the restricted data rate or an enhanced data rate.

When the dual-operating system environment is detected, the portable electronic device can take steps to verify whether the device is authorized to communicate with the wide area network at the enhanced data rate. Where it is, the portable electronic device can configure the second operating system environment to communicate with the wide area network at the enhanced data rate. Where it is not, several optional steps can be taken, such as disabling the second operating system environment, restricting applications operating in the second operating system environment to a restricted data rate, switching an access point name to a restricted mode access point name, and so forth.

In one embodiment, the verification for WebTop enhanced data usage rates occurs when both data communication with the wide area network is possible and the WebTop is active. Other verification conditions can include an active mode of the WebTop, whether or not the current service provider requires authentication prior to enhanced data rate usage, whether a coupled peripheral hardware device requires verification, whether timers within the portable electronic device have expired from previous entitlement grants, and so forth.

Turning now to FIG. 1, illustrated therein is one embodiment of a portable electronic device 100 configured for communication with a wide area network 104. The illustrative portable electronic device 100 of FIG. 1 is shown as a smart phone for illustration. However, it will be obvious to those of ordinary skill in the art having the benefit of this disclosure that other portable electronic devices may be substituted for the explanatory smart phone of FIG. 1. For example, the portable electronic device 100 may be configured as a palmtop computer, a tablet computer, a gaming device, a media player, or other device.

The illustrative portable electronic device 100 may include standard components such a user interface 107 and associated modules. The user interface 107 can include various combinations of a display, a keypad, voice control modules, and/or touch sensitive interfaces. The portable electronic device 100 includes a communication device 110. The communication device 110 is configured for communication with one or more networks 104,103,120, and can include wireless communication circuitry, one of a receiver, a transmitter, or transceiver, and an antenna 112.

The communication device 110 is configured for data communication with at least one wide area network 104. For illustration, the wide area network 104 of FIG. 1 is shown as a cellular network being operated by a service provider 121. Examples of cellular networks include GSM, CDMA, W-CDMA, CDMA-2000, iDEN, TDMA, and other networks. It should be understood that the communication device 110 could be configured to communicate with multiple wide area networks as well, with one being shown in FIG. 1 for simplicity.

The portable electronic device 100 can optionally be configured to communicate with a local area network 103, such as the WiFi network being supported by a local area network router 113. Local area networks can be connected through communication nodes, e.g., local area network router 113, to other networks, such as the Internet, which is represented by network 120 in FIG. 1. For example, the local area network 103 can provide data communication through a non-IMS channel.

The portable electronic device 100 includes one or more processors 102, which are responsible for performing the functions of the device. The one or more processors 102 can be a microprocessor, a group of processing components, one or more Application Specific Integrated Circuits (ASICs), programmable logic, or other type of processing device. The one or more processors 102 are operable with the user interface 107 and the communication device 110, as well as various peripheral ports 105 that can be coupled to peripheral hardware devices 106 via interface connections 108. The one or more processors 102 process and execute executable software code to perform the various functions of the portable electronic device 100. A storage device 109, such as a memory module, stores the executable software code used by the one or more processors 102 for device operation. The storage device 109 may also store identification information suitable for identifying the portable electronic device 100 or its user to the service provider 121. In one embodiment, the identification information includes information identifying the user and the type of subscription held by the user for wireless communication services.

The one or more processors 102 are configured to host a dual-operating system hybrid environment 111. A first operating system environment 114 can be configured for normal data rate communication 115 with the wide area network 104. This "normal" data rate communication 115 is referred to as "Mobile Communication" and can be used for voice calls, mobile device web browsing, text and multimedia messages, and so forth. Typical normal data rate communication 115 occurs with data being exchanged below one megabit per second.

The second operating system environment 116 is operable to communicate with the wide area network 104 using enhanced data rate communication 117. One example of the second operating system environment 116 is the WebTop environment discussed above, in which enhanced, full, multi-window desktop environments can be used, where the portable electronic device 100 can access a desktop class web browser and web applications, which are similar to those normally found only on a personal computer. "Enhanced" data rates can vary by service provider and technology. In general terms, a particular service provider will offer both a normal throughput in bits per second and a maximum allowed data limit in total bits downloaded and/or uploaded per month. For discussion purposes, one example of an enhanced data rate communication 117 include communication occurring at data rates in excess of one megabit per second, such as the enhanced fourth generation enhanced data transmission speeds that are in excess of two megabits per second. It will be clear to those of ordinary skill in the art that the enhanced data rate can change as technology is developed or across service providers.

In one or more embodiments, the second operating system environment 116 can also be configured for communication with the wide area network at a restricted data rate as well. For example, in one embodiment the restricted data rate is the rate corresponding to the normal data rate communication 115, or a rate that averages below or about one megabit per second. This threshold is illustrative, as some networks and some providers will have higher thresholds for normal data rate communication 115, while others will have lower thresholds for normal data rate communication 115. When the second operating system environment 116 is launched, for a user to use enhanced data rate communication 117, an authentication check is performed to ensure that the subscription plan associated with the user permits enhanced data rate communication 117.

To perform the authentication, in one embodiment the one or more processors 102 initially confirm that data communication is possible between the communication device 110 and the wide area network 104. This will generally be the case when the portable electronic device 100 is within range of the wide area network 104, e.g., is within the communication radius of a tower 118 of the wide area network 104, and where the communication device 110 is active. Data communication would not be possible in cases where, for example, the portable electronic device was OFF, or where the portable electronic device 100 had been placed in a "airplane mode" or other mode that disables the wide area communication capabilities of the communication device 110.

The one or more processors 102 then initiate the dual-operating system hybrid environment 111 by making the first operating system environment 114 and the second operating system environment 116 simultaneously operative. In many applications, the first operating system environment 114 will be continually active, while the second operating system environment 116 is selectively activated. For example, in one embodiment the second operating system environment 116 is activated when a peripheral hardware device 106 that includes a dual-operating system license key 119 is coupled to an interface connection 108 in communication with the one or more processors 102. Examples of peripheral hardware devices 106 include external displays, as will be shown in FIGS. 3, 5, and 6 below, peripheral connectors, as will be shown in FIG. 3.

Where the communication device 110 is in communication with the wide area network 104 and the dual-operating system hybrid environment 111 is active, can verify whether the portable electronic device 100 is authorized for the enhanced data rate communication 117 with the wide area network 104. This can be done, in one embodiment, by transmitting a verification request message 122 from the communication device 110 across the wide area network 104 to the service provider 121. The service provider 121 can internally perform the necessary checks, which can be based upon the identification information stored in the storage device 109, to confirm whether the portable electronic device 100 is authorized for enhanced data rate communication 117. The service provider 121 can then transmit a response message 123 back to the communication device 110. In one embodiment, the response message 123 includes a permission code or acknowledgement code that can be compared to an authorization code stored within the portable electronic device 100. Other authentication methods will be obvious to those of ordinary skill in the art having the benefit of this disclosure.

Where the portable electronic device 100 is authorized for enhanced data rate communication 117 with the wide area network 104, i.e., where the verification step above is true, the one or more processors 102 can configure the communication device for enhanced data rate communication 117. This allows the authorized user to use enhanced, full, multi-window desktop environments supported by the one or more processors 102. Accordingly, the user can enjoy second operating system environment applications, including desktop class web browsers and web applications.

In one embodiment, once authorization for enhanced data rate communication 117 is obtained, the one or more processors 102 can be configured to initiate a timer 124. When the timer 124 expires, the one or more processors 102 can be configured to again verify whether the portable electronic device 100 is authorized for the enhanced data rate communication 117 with the wide area network 104 upon expiration of the timer. For example, the timer 124 may be configured to expire after a predetermined time, such as four hours, six hours, twelve hours, or twenty-four hours. The inclusion of this feature prevents a user from docking the portable electronic device 100 in a docking station, obtaining a single authorization for enhanced data rate communication 117, changing his data plan, and continuing to receive enhanced data rate communication 117 by never un-docking the portable electronic device 100.

Where the portable electronic device 100 is not authorized for enhanced data rate communication 117 with the wide area network, i.e., where the verification step is false, a number of steps can be taken. In one embodiment, where the second operating system environment 116 is configured for both enhanced data rate communication 117 and restricted data rate communication, e.g., normal data rate communication 115, the one or more processors 102 can configure the communication device 110 for restricted data rate communication only. In such an embodiment, the user would still be able to enjoy the WebTop applications available in the second operating system environment. However, the user would not be able to run those applications using the enhanced data rate communication 117 data pipe of the wide area network 104. They would instead run at the restricted data rate communication levels, which can be an order of magnitude slower than the enhanced data rate communication 117.

In another embodiment, the one or more processors 102 can be configured to use local area network communication with the second operating system environment 116. For example, where the communication device 110 is configured for operation with both a wide area network 104 and a local area network 103, the one or more processors 102 may configure the communication device 110 to communicate only with the local area network 103.

In another embodiment, the one or more processors 102 may be configured to disable one or more applications operable in the second operating system environment 116. For example, some applications, like gaming applications, may use very little data. Accordingly, the user may not be able to distinguish whether the gaming application is operating with normal data rate communication 115 or enhanced data rate communication 117. By contrast, a desktop class web browser may appear to grind to a halt if enhanced data rate communication 117 is not used. Accordingly, if the portable electronic device 100 is not authorized for enhanced data rate communication 117, the one or more processors 102 may be configured to disable the desktop class web browser or other high data rate applications.

In another embodiment, the one or more processors 102 may be configured to restrict data communication for one or more applications operable in the second operating system environment 116. For example, when the user's account does not have permission to use enhanced data rate communication 117 with the wide area network 104, corresponding network traffic can be restricted. Mobile View communication, which employs normal data rate communication 115, can continue, but other communication, such as that to web browsers, can be restricted. The mechanism for restricting communication can be provided in the browser's kernel's networking capabilities. Internet Protocol tables tool can be used to add positive and negative routing rules. A routing rule can be used to allow or disallow network traffic associated with the portable electronic device 100 (ppp0) under which WebTop processes execute.

In another embodiment, the one or more processors 102 can be configured to change an access point name associated with the portable electronic device 100. In the dual-operating system hybrid environment 111, the one or more processors 102 can start a process by communicating with the service provider 121 using a predetermined access point name. The service provider 121 can perform checks with respect to whether the portable electronic device 100 is associated with a proper subscription plan permitting enhanced data rate communication 117. Where the result is false, the one or more processors can be configured to switch to a restricted usage access point name designated by the service provider 121. Such a feature is particularly useful where the service provider 121 uses a discrete access point name for routing and data features, and a secondary access point name solely for authentication. The standard mobile access point name can be switched to another access point name, with the result of the switching being indicative of permission to use wide area network data communication pipes.

In another embodiment, the one or more processors 102 can be configured to deliver a notification to the user when the result of the verifying step is false. For example, the one or more processors 102 can present a notification 125 on a display of the user interface 107 indicating that the verification step has indicated that the portable electronic device 100 is not authorized for enhanced data rate communication 117. The notification 125 can optionally include contact information of the service provider 121, such as a telephone number, fax number, website, email address, or other contact information. In one embodiment, the notification 125 includes a link to alternative networks, such as local area network 103.

Turning to FIGS. 2-6, illustrated therein are various operating system environments being used on a portable electronic device 100 configured in accordance with one or more embodiments of the invention. Beginning with FIG. 2, a user 200 is holding the portable electronic device 100 while operating in a first operating system environment (114). In this illustrative example, the first operating system environment (114) is a smart cellular telephone mode. The first operating system environment (114) has associated therewith various applications capable of operating at normal data rate communication (115). Examples of such applications include a cellular telephone application 201, a mobile web browser application 202 configured for operation at data rates under 1.5 megabits per second, an Internet shopping application 204, a camera application 205, an Internet search application 206, and a social media application 207. These applications are illustrative only, as others will be obvious to one of ordinary skill in the art having the benefit of this disclosure. Each of the applications has a common element, however, in that it is operable at reduced data rates so as not to overly tax cellular or other wide area networks.

Figure 3:
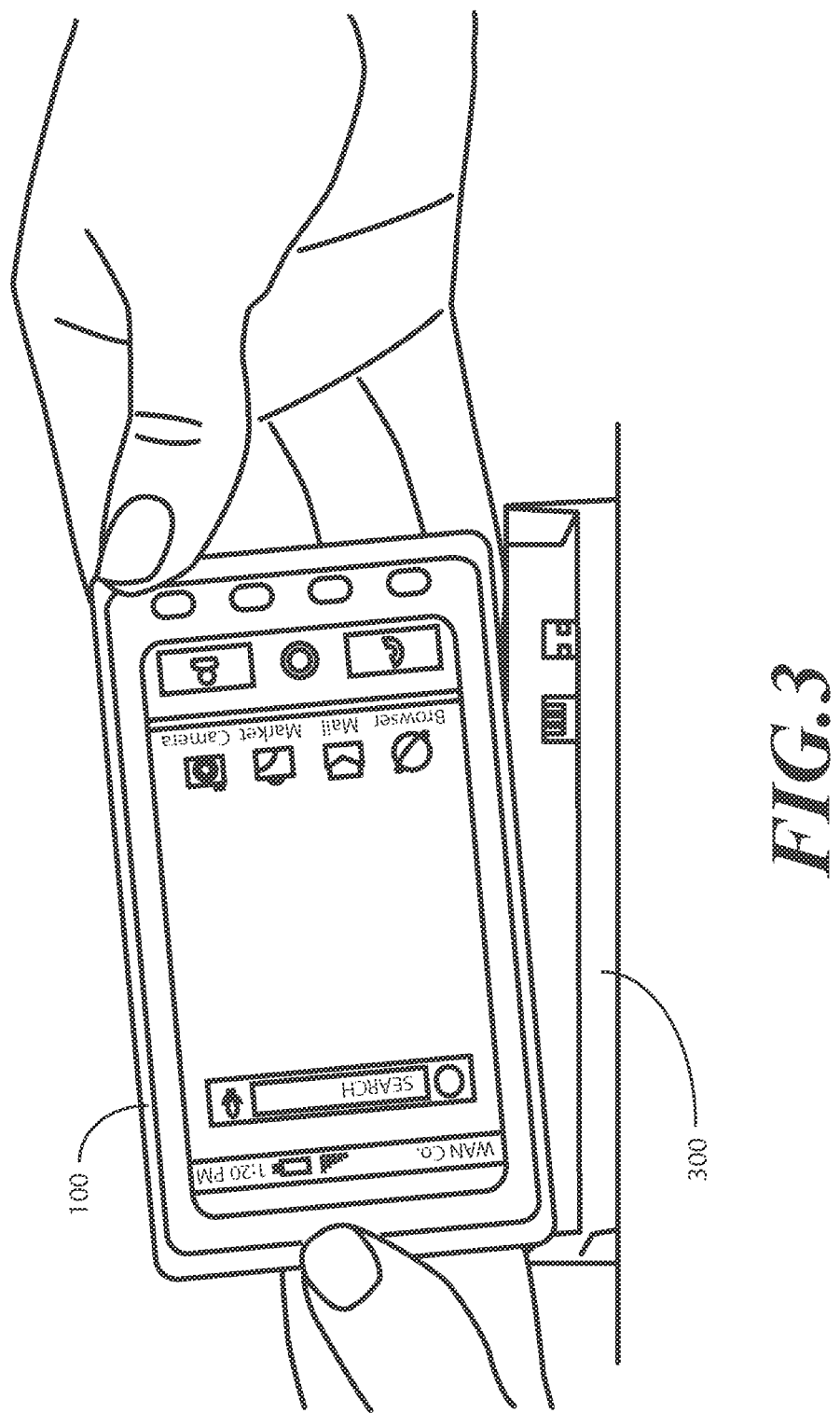
FIGS. 3-6 illustrate explanatory portable electronic devices being coupled to peripheral hardware devices to launch a dual-operating system hybrid environment in accordance with one or more embodiments of the invention.

As shown in FIG. 3, in one embodiment, the portable electronic device 100 can be coupled to a peripheral hardware device (106). The peripheral hardware device (106) of FIG. 3 is a peripheral connector 300 that delivers one or more signals to an external device. In one embodiment, in addition to making the portable electronic device 100 operable with a peripheral component, the peripheral connector 300 may also include a dual-operating system license key (119) stored in an on-board memory device. The one or more processors (102) of the portable electronic device 100 can be configured to retrieve the dual-operating system license key (119) and then launch the second operating system environment (116). Examples of peripheral connectors 300 include HDMI cables, USB connectors, and so forth.

Figure 4:
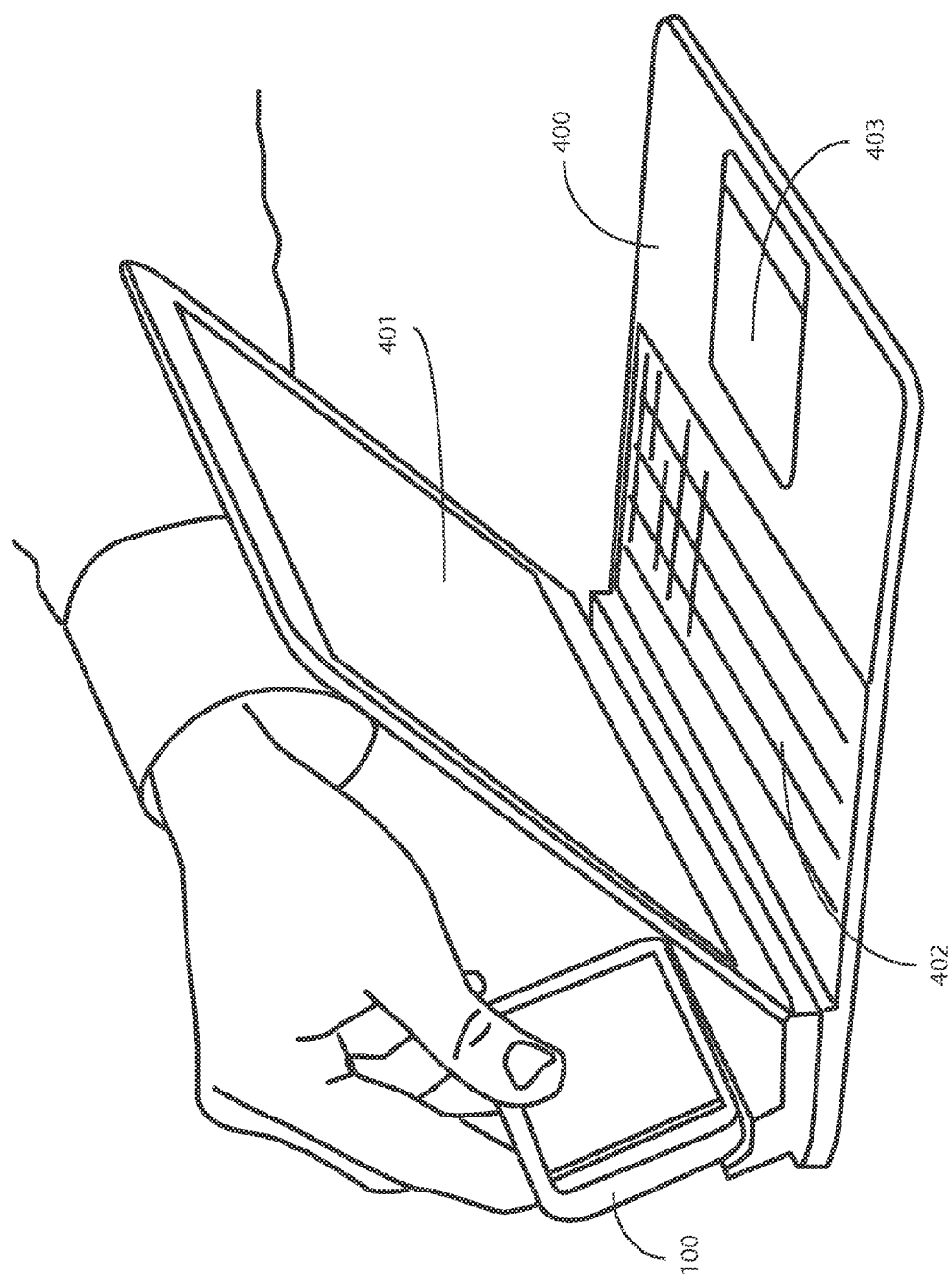
Figure 5:
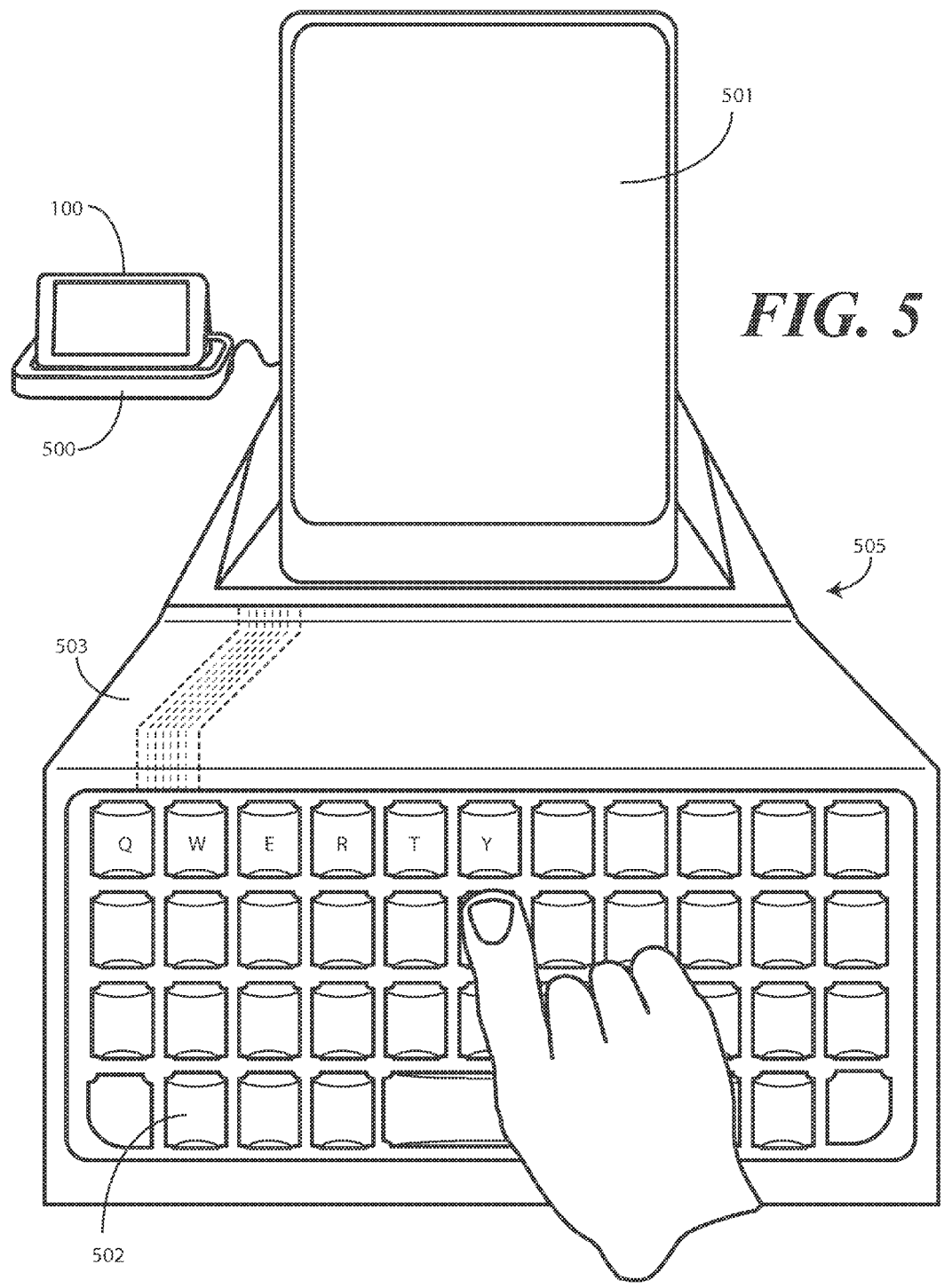
Figure 6:
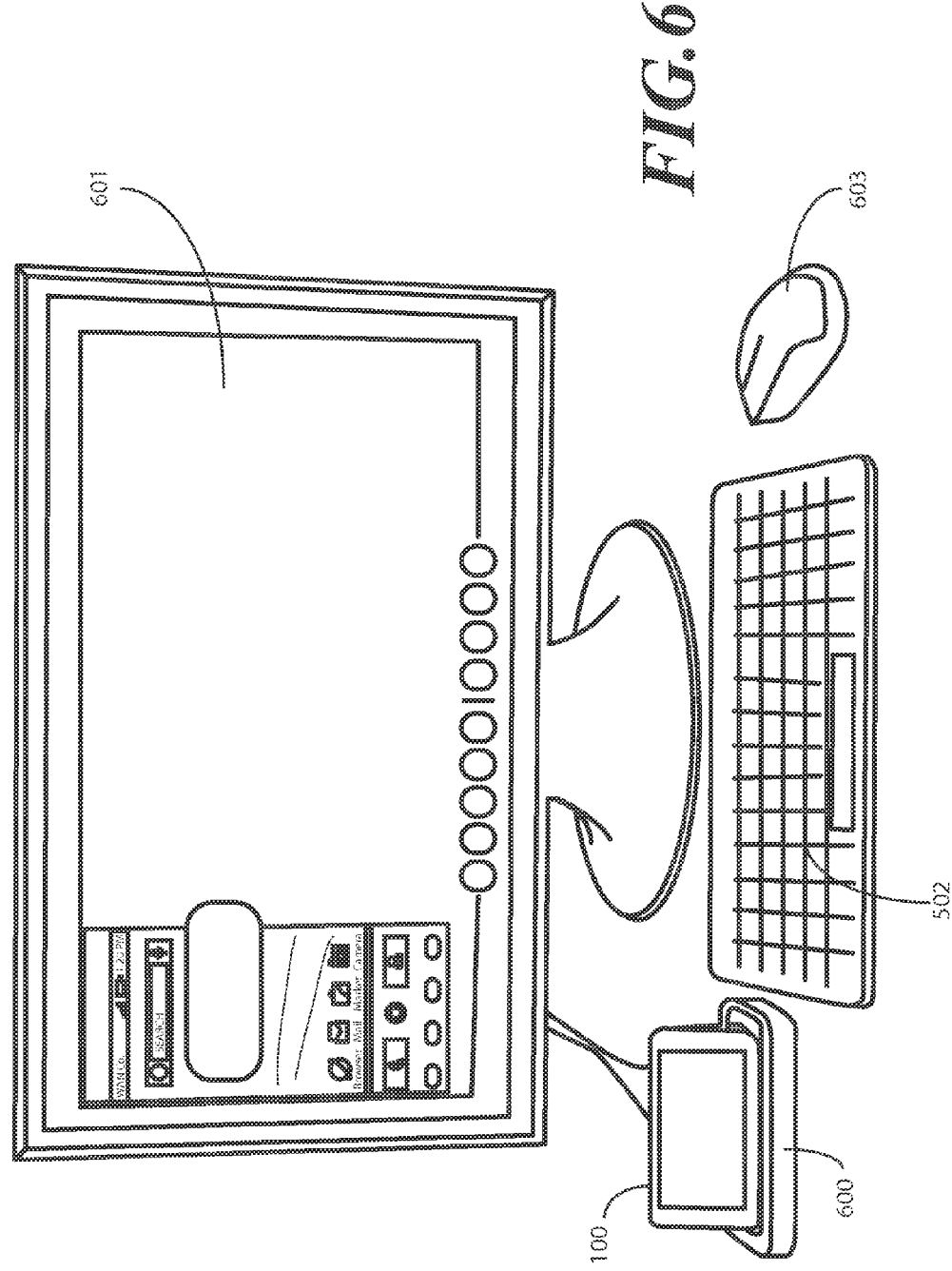

FIGS. 4-6 illustrate a variety of peripheral hardware devices to which an illustrative portable electronic device can be coupled for use with the second operating system environment (116). In FIG. 4, the portable electronic device 100 has been docked in a docking station 400 having an external display 401 (external with reference to the portable electronic device 100), a full QWERTY keyboard 402, and a touchpad 403. Applications configured for operation in the second operating system environment (116) can be presented on the external display 401. In the system of FIG. 4, the portable electronic device 100 couples to the docking station to resemble a traditional laptop computer. However, processing power is provided by the one or more processors (102) of the portable electronic device 100.

In FIG. 5, the portable electronic device 100 has been docked in a docking station 500 operable with a folio 505. The folio 505 can be similar to the docking station (400) of FIG. 4, or can have flexible components, including a flexible keypad 502 and flexible housing 503. This illustrative folio 505 has an external display 501, upon which applications configured for operation in the second operating system environment (116) can be presented.

In FIG. 6, the portable electronic device 100 has been docked in a docking station 600 coupled by a wire to an external display 601, a separate, full QWERTY keyboard 602, and a mouse 603. Applications configured for operation in the second operating system environment (116) can be presented on the external display 601. In the system of FIG. 6, the portable electronic device 100 couples to the docking station 600 to resemble a traditional desktop computer. However, processing power is provided by the one or more processors (102) of the portable electronic device 100.

Figure 7:
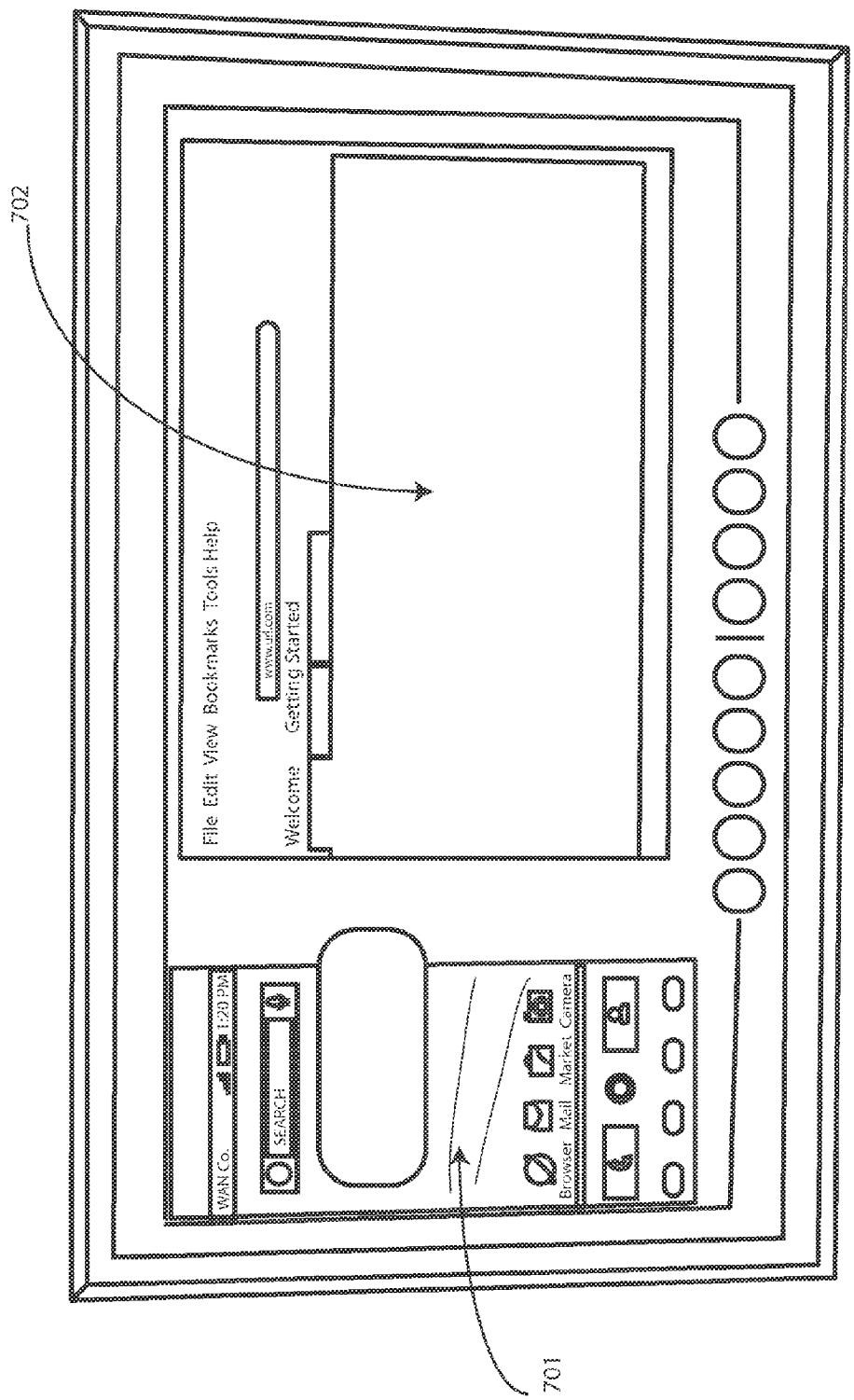
FIG. 7 illustrates a second operating system environment of a dual-operating system hybrid environment configured in accordance with one or more embodiments of the invention.

FIG. 7 illustrates the dual-operating system hybrid environment (111) in operation. A Mobile View window 701 is presented and contains indicia of applications operating in the first operating system environment (114). A WebTop window 702 is presented and contains indicia of applications operating in the second operating system environment (116). When the dual-operating system hybrid environment (111) is operable, a user can get the best of both worlds. Mobile applications, such as incoming telephone calls, can be received by interacting with the Mobile View Window 701, while desktop class applications, such as desktop web browsers, can be accessed by interacting with the WebTop window 702. Accordingly, the user gets desktop class applications while the portable electronic device (100) is docked, without losing mobile applications. In one embodiment, docking the portable electronic device (100) allows enhanced application capabilities, provides access to, for example, additional USB ports, and so forth. In short, in one embodiment the portable electronic device (100) is a smart phone having capabilities shown in the Mobile View window 701 and using normal data rate communication (115) when not docked, and then transforms into a hybrid operating system environment with desktop capabilities shown in the WebTop window 702 using enhanced data rate communication (117) when docked. In one or more embodiments, verification of authorization to use enhanced data rate communication (117) is performed upon booting the portable electronic device (100), the portable electronic device (100) being in communication with a cellular or other wide area network (104), and the dual-operating system hybrid environment (111) being active.

Figure 8:
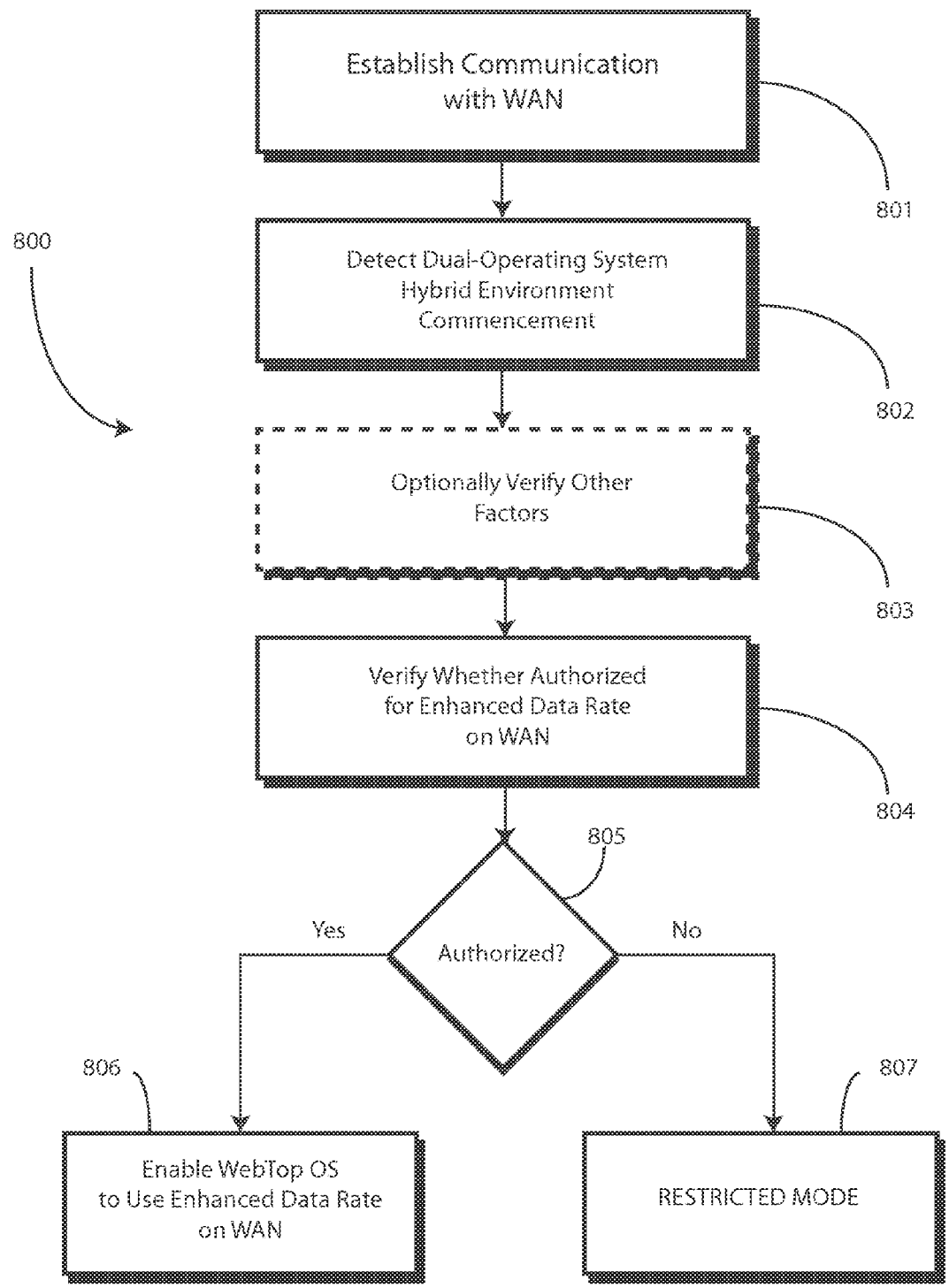
FIG. 8 illustrates one method in a portable electronic device of authenticating enhanced wide area network data usage capabilities in accordance with one or more embodiments of the invention.

FIG. 8 illustrates one method 800, suitable for use in a portable electronic device, of authenticating enhanced wide area network data usage capabilities in accordance with one or more embodiments of the invention. Many of the steps have been described above with reference to the system of FIG. 1.

At step 801, the method 800 establishes data communication between a communication device of the portable electronic device and a wide area network. In one embodiment, the wide area network is a cellular network.

At step 802, one or more processors of the portable electronic device detect commencement of a dual-operating system hybrid environment on the one or more processors. As noted above, the dual-operating system hybrid environment can include a first operating system environment that operable to communicate with the wide area network at a restricted data rate, such as less than one megabit per second, a second operating system environment that is operable to communicate with the wide area network at an enhanced data rate, such as greater than one megabit per second. In one embodiment, the second operating system environment is configured to be operable at either the restricted data rate or the enhanced data rate.

At step 803, other optional factors can be verified. For example, in one embodiment step 803 verifies that the processors of the portable electronic device have been properly booted. In another embodiment, step 803 verifies that the portable electronic device is coupled to a peripheral hardware device. In another embodiment, step 803 verifies that the portable electronic device is coupled to a peripheral hardware device having a dual-operating system hybrid environment license stored therein. In another embodiment, when the portable electronic device is initially in communication with a local area network, step 803 verifies whether communication with the local area network communication has terminated, since authorization for communication with a wide area network is moot while communication is occurring with a local area network. Other optional factors will be obvious to those of ordinary skill in the art having the benefit of this disclosure.

At step 804, after the detecting at step 802, the method 800 verifies whether the portable electronic device is authorized to communicate with the wide area network at the enhanced data rate. While the verification step can occur for the system as a whole, in one or more embodiments the verification step is performed on an application-by-application basis in the second operating system environment. The application-by-application verification allows low data consumption applications to launch while restricting high data consumption applications.

In one embodiment, step 804 includes transmitting a message with the communication device inquiring whether the portable electronic device is authorized for communication with the wide area network at the enhanced data rate. Step 804 can also include receiving a response message indicating whether the portable electronic device is authorized for communication with the wide area network at the enhanced data rate.

The decision regarding whether enhanced data rate communication is authorized occurs at decision 805. Where the portable electronic device is authorized for enhanced data rate communication, step 806 includes configuring, with one or more processors, the second operating system environment to communicate with the wide area network at the enhanced data rate.

Where the portable electronic device is not authorized for communication with the wide area network at the enhanced data rate, the portable electronic device is placed in a restricted operation mode at step 807. The restricted operation mode can take any of a variety of forms, many of which are shown in FIG. 9.

Figure 9:
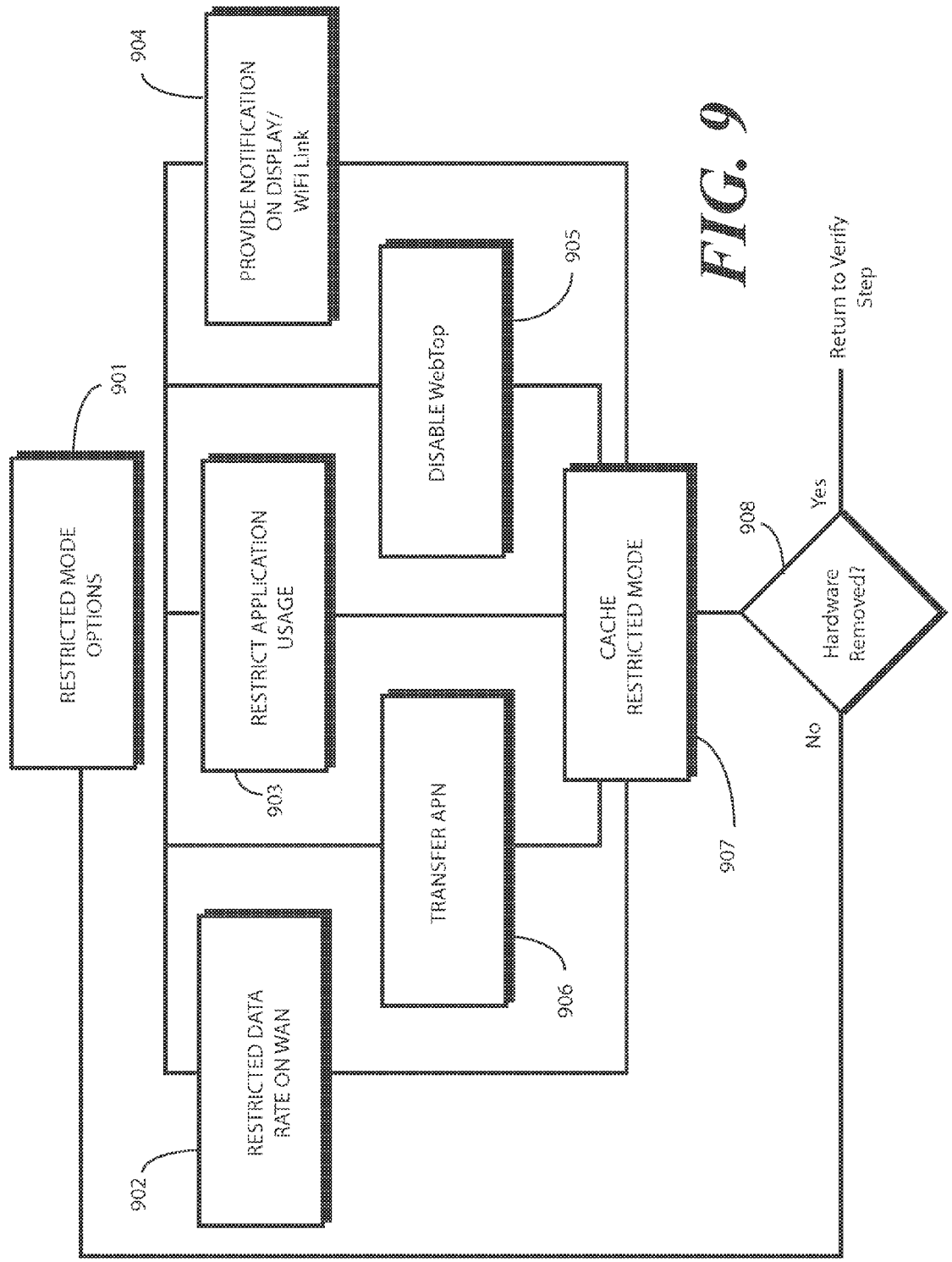
FIG. 9 illustrates one method in a portable electronic device of again authenticating enhanced wide area network data usage capabilities in accordance with one or more embodiments of the invention.

Turning to FIG. 9, illustrated therein are some restricted operational mode options 901. In one embodiment, the restricted operational mode includes restricting data usage rates 902 for applications operating in the second operating system environment. In another embodiment, the restricted operational mode includes restricting application usage 903 in the second operating system environment. Said differently, in one embodiment the restricted operational mode can include restricting one or more applications from launching in the second operating system environment. For example, web browsers may be turned OFF, while other applications that do not consume as much data from a wide area network are allowed to run.

In another embodiment, the restricted operational mode includes comprising presenting 904, on a display operable with the portable electronic device, a notification that the portable electronic device is unauthorized to communicate with the wide area network. This notification can include a local area network communication connection indication, such as a link to initiate local area network WiFi communication.

In another embodiment, the restricted operational mode includes simply disablement 905 of the second operating system environment. For example, the method (800) can simply disable WebTop from launching altogether.

In another embodiment, the restricted operational mode includes a transfer 906 of an access point name. For example, the transfer 906 can include transitioning an access point name of the portable electronic device to a restricted usage mode access point name as described above.

In one or more embodiments, when the restricted mode is entered, an indication of the same is cached 907 for as long as a predefined condition exists. For example, where the second operating system environment is predicated upon a peripheral hardware device having a dual-operating system hybrid environment license, the indication of the restricted mode can be cached 907 until the portable electronic device is decoupled from the peripheral hardware device as determined at decision 908. The method (800) can then again verify whether the portable electronic device is authorized to communicate with the wide area network at the enhanced data rate by returning to step 804 of FIG. 8.

Figure 10:
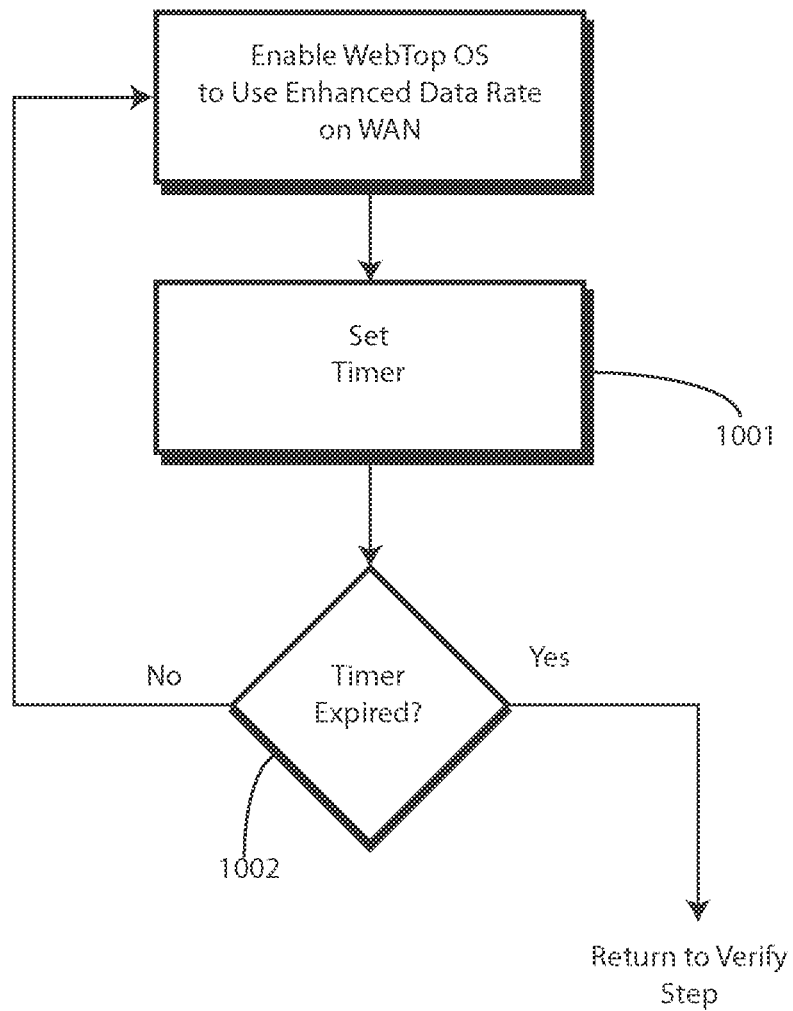
FIG. 10 illustrates methods of entering restricted usage modes, in accordance with one or more embodiments of the invention, when enhanced wide area network data usage capabilities are not authenticated.

Turning to FIG. 10, it is contemplated that it can be beneficial to periodically re-verify whether enhanced data rate communication is authorized to prevent "free loading" where a user initially pays for enhanced data rate communication, docks the portable electronic device to get a true verification, and then subsequently turns off data rate communication but leaves the portable electronic device docked. To prevent this, in one embodiment the method (800) includes initiating a timer at step 1001. Upon expiration of the timer, as determined at decision 1002, the method (800) can again verify whether the portable electronic device is authorized to communicate with the wide area network at the enhanced data rate. As described above, the timer can be set to any of a number of time durations, including four hours, six hours, twelve hours, twenty-four hours, and so forth.

As described above, methods and systems for providing an authentication of enhanced data rate communication on a wide area network from a portable electronic device having a dual-operating system hybrid environment is provided. In on embodiment, upon initially launching the dual-operating system hybrid environment, the authentication occurs. If the dual-operating system hybrid environment is not authorized, the authentication can be cached for a predetermined time. Additionally, periodic re-authentication checks can be performed, such as every twenty-four hours or every twelve hours. In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a portable electronic device of authenticating enhanced wide area network data usage capabilities, comprising:

establishing data communication between a communication device of the portable electronic device and a wide area network; and detecting commencement of a dual-operating system hybrid environment on one or more processors of the portable electronic device, wherein the dual-operating system hybrid environment comprises:

a first operating system environment operable to communicate with the wide area network at a restricted data rate; and a second operating system environment operable to communicate with the wide area network at either the restricted data rate or an enhanced data rate;

after the detecting, verifying whether the portable electronic device is authorized to communicate with the wide area network at the enhanced data rate; and where the verifying indicates the portable electronic device is authorized to communicate with the wide area network at the enhanced data rate, configuring, with the one or more processors, the second operating system environment to communicate with the wide area network at the enhanced data rate.

2. The method of claim 1, further comprising initiating a timer, and upon expiration of the timer, again verifying whether the portable electronic device is authorized to communicate with the wide area network at the enhanced data rate.

3. The method of claim 1, wherein the detecting comprises identifying a hardware device is coupled with the portable electronic device, the hardware device comprising a dual-operating system hybrid environment license.

4. The method of claim 1, wherein the verifying comprises:
transmitting a message with the communication device inquiring whether the portable electronic device is authorized for communication with the wide area network at the enhanced data rate; and
receiving a response message indicating whether the portable electronic device is authorized for communication with the wide area network at the enhanced data rate.

5. The method of claim 1, wherein when the portable electronic device is initially in communication with a local area network, further comprising waiting until local area network communication terminates before performing the verifying.

6. The method of claim 1, where the verifying indicates the portable electronic device is unauthorized to communicate with the wide area network at the enhanced data rate, configuring, with the one or more processors, the second operating system environment to communicate with the wide area network at the restricted data rate.

7. The method of claim 6, further comprising presenting, on a display operable with the portable electronic device, a notification that the portable electronic device is unauthorized to communicate with the wide area network.

8. The method of claim 6, further comprising restricting one or more applications from launching in the second operating system environment.

9. The method of claim 6, wherein the detecting comprises identifying a hardware device is coupled with the portable electronic device, the hardware device comprising a dual-operating system hybrid environment license, further comprising maintaining data communication in the second operating system environment at the restricted data rate until the hardware device is detached from the portable electronic device.

10. The method of claim 6, further comprising providing a local area network communication connection indication on a display operable with the portable electronic device.

11. The method of claim 6, further comprising transitioning an access point name of the portable electronic device to a restricted usage mode access point name.

12. The method of claim 1, wherein the verifying occurs on an application-by-application basis.

13. A portable electronic device, comprising:
one or more processors;
a communication device operable with the one or more processors;
a dual-operating system hybrid environment operable on the one or more processors having at least one operating system operable to communicate with a wide area network at either a restricted data rate or an enhanced data rate;
wherein the one or more processors are configured to:
confirm data communication between the communication device and the wide area network;
initiate the dual-operating system hybrid environment;
verifying by communication between the communication device and the wide area network whether the portable electronic device is authorized for the enhanced data rate communication with the wide area network; and
configure the communication device for enhanced data rate communication with the wide area network only where the verifying is true.

14. The portable electronic device of claim 13, further comprising an external port coupled to the one or more processors, wherein the one or more processors are configured to initiate the dual-operating system hybrid environment upon a peripheral device comprising a dual-operating system license key being coupled to the external port.

15. The portable electronic device of claim 14, wherein the peripheral device comprises an external display device.

16. The portable electronic device of claim 13, further comprising a timer, operable with the one or more processors, wherein the one or more processors are configured to again verify whether the portable electronic device is authorized for the enhanced data rate communication with the wide area network upon expiration of the timer.

17. The portable electronic device of claim 13, wherein the one or more processors are configured to configure the communication device for restricted data rate communication with the wide area network where the verifying is false.

18. The portable electronic device of claim 17, wherein the one or more processors are further configured to configure the communication device for data communication with a local area network where the verifying is false.

19. The portable electronic device of claim 13, wherein the one or more processors are configured to disable one or more applications operable in the at least one operating system where the verifying is false.

20. The portable electronic device of claim 13, wherein the portable electronic device is configured to operate in at least a cellular telephone mode, wherein the wide area network comprises a cellular network.

* * * * *